(12) United States Patent
Kokomoto et al.

(10) Patent No.: US 9,300,836 B2
(45) Date of Patent: Mar. 29, 2016

(54) IMAGE FORMING APPARATUS ENABLING CIRCUIT-CYCLING TIME OF IMAGE CARRIER INCLUDED IN TRANSFER UNIT TO BE FOUND ACCURATELY

(71) Applicant: Kyocera Document Solutions Inc., Osaka (JP)

(72) Inventors: Mari Kokomoto, Osaka (JP); Kenji Miyamoto, Osaka (JP); Takahiro Honda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/474,137

(22) Filed: Aug. 30, 2014

(65) Prior Publication Data

US 2015/0078775 A1 Mar. 19, 2015

(30) Foreign Application Priority Data

Aug. 30, 2013 (JP) ................................ 2013-179376
Jul. 29, 2014 (JP) ................................ 2014-153953

(51) Int. Cl.
*G03G 15/20* (2006.01)
*G03G 15/16* (2006.01)
*H04N 1/29* (2006.01)
*G03G 15/00* (2006.01)

(52) U.S. Cl.
CPC ............. *H04N 1/29* (2013.01); *G03G 15/5054* (2013.01); *H04N 2201/0094* (2013.01)

(58) Field of Classification Search
CPC ............ H04N 1/29; H04N 2201/0094; G06K 15/129; G03G 15/5054
USPC .................................. 399/308, 302, 301, 66
See application file for complete search history.

(56) References Cited

U.S. PATENT DOCUMENTS

2007/0144871 A1* 6/2007 Tao et al. ................. 198/810.03
2013/0051827 A1* 2/2013 Fukumuro ...................... 399/49

FOREIGN PATENT DOCUMENTS

JP 2003-029543 A 1/2003

* cited by examiner

*Primary Examiner* — Billy Lactaoen
(74) *Attorney, Agent, or Firm* — James W. Judge

(57) ABSTRACT

An image forming apparatus includes: a transfer unit, a reflectance sensor, a time-series data acquiring unit, and a transfer-unit rotation-time calculating unit. The time-series data acquiring unit is configured to acquire time-series data with respect to the image carrier background-portion reflectance, measured by the reflectance sensor, as reference data over a time period twice longer than a time period that by design the image carrier requires for one cycle, and as advance/delay data over a time period twice longer than a time period longer or shorter in multiples of a predetermined time interval than the by-design time period. The transfer-unit rotation-time calculating unit is configured to calculate a one-cycle-time calculation value that is the time actually required for one cycle of the image carrier, based on the reference data and the advance/delay data acquired by the time-series data acquiring unit.

4 Claims, 9 Drawing Sheets

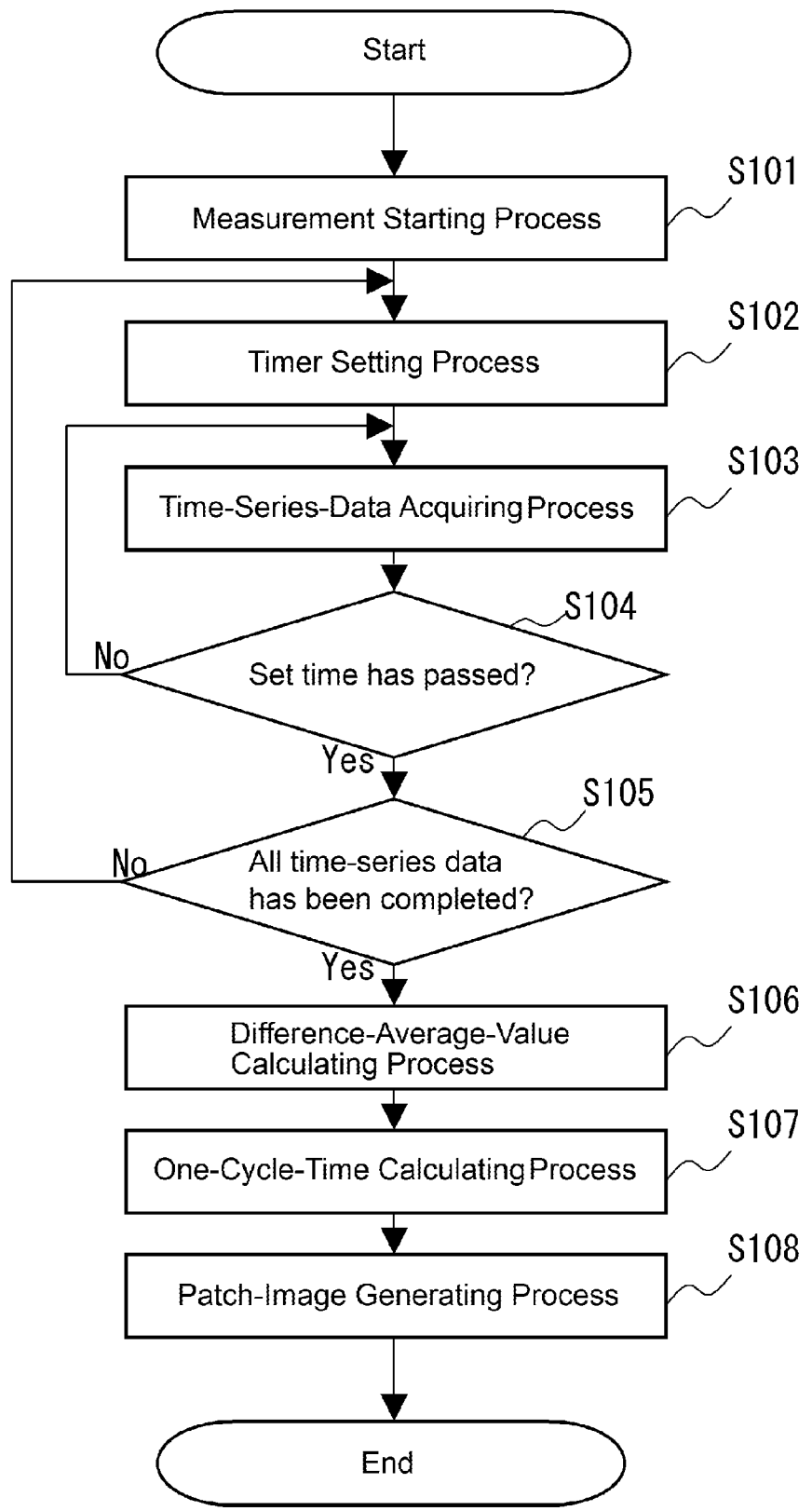

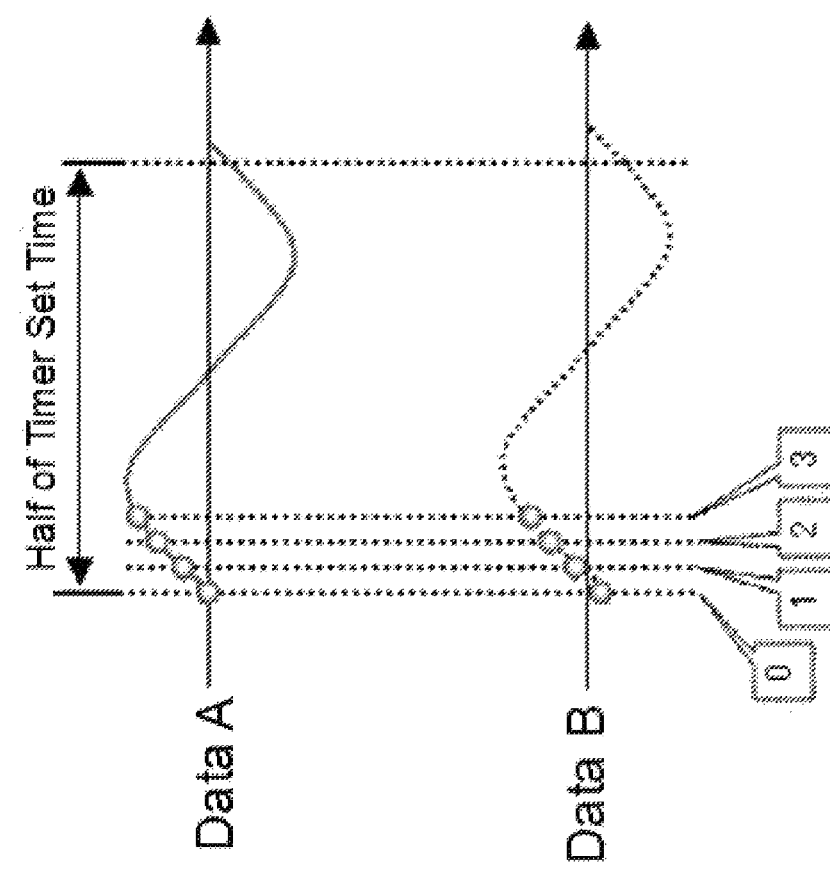

FIG. 4B
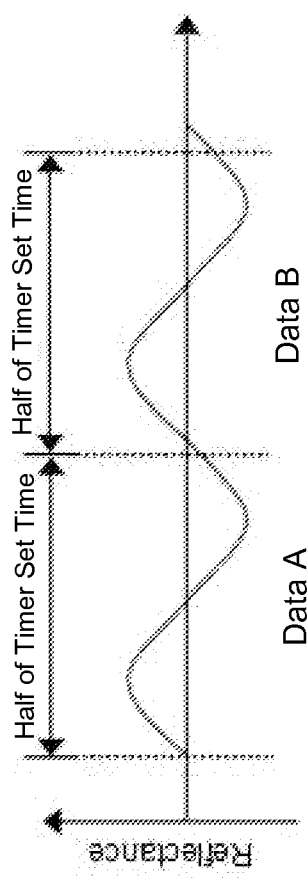
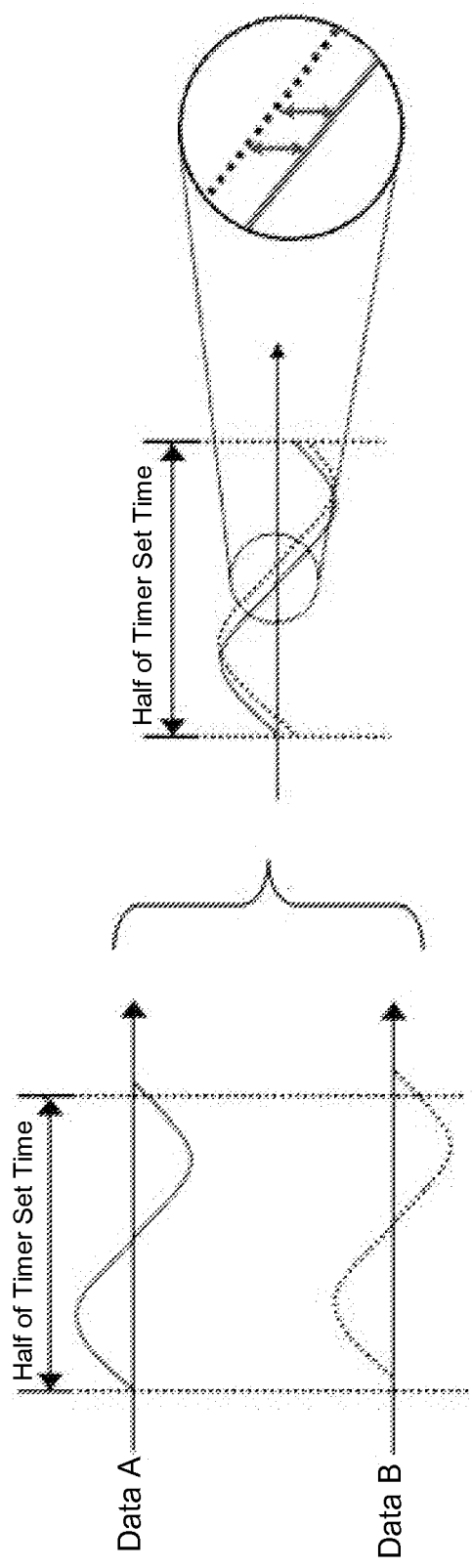

FIG. 5

| Time Difference | -3$\Delta$t | -2$\Delta$t | -$\Delta$t | 0 | $\Delta$t | 2$\Delta$t | 3$\Delta$t |
|---|---|---|---|---|---|---|---|
| Average Value of Difference | Average Value 1 | Average Value 2 | Average Value 3 | Average Value 4 | Average Value 5 | Average Value 6 | Average value 7 |
| Time For One Cycle | Tb-3$\Delta$t | Tb-2$\Delta$t | Tb-$\Delta$t | Tb | Tb+$\Delta$t | Tb+2$\Delta$t | Tb+3$\Delta$t | ns
IMAGE FORMING APPARATUS ENABLING CIRCUIT-CYCLING TIME OF IMAGE CARRIER INCLUDED IN TRANSFER UNIT TO BE FOUND ACCURATELY

CROSS-REFERENCE TO RELATED APPLICATION

This application is based upon, and claims the benefit of priority from, corresponding Japanese Patent Application Nos. 2013-179376 filed on Aug. 30, 2013 and 2014-153953 filed on Jul. 29, 2014 in the Japan Patent Office on Aug. 30, 2013, the entire contents of which are incorporated herein by reference.

BACKGROUND

Unless otherwise indicated herein, the description in this section is not prior art to the claims in this application and is not admitted to be prior art by inclusion in this section.

Typically, there is known an image forming apparatus such as a multifunctional peripheral (MFP) that can print a document and an image. In particular, in an image forming apparatus for color printing, toner images in respective colors in which electrostatic latent images are exposed by a laser or similar method are developed are once superimposed on an intermediate transfer belt of a transfer unit and then transferred to a recording sheet at a time.

As a typical image forming apparatus using the transfer unit, there is a technique that performs correction using at least one or more reference position marks disposed at an intermediate transfer belt such that the transfer position of a toner image to a transfer material is not displaced from a predetermined transfer position even when the perimeter of the intermediate transfer belt changes with time or when there is an individual difference in perimeter of the intermediate transfer belt during production.

SUMMARY

An image forming apparatus of the disclosure includes a transfer unit, a reflectance sensor, a time-series data acquiring unit, and a transfer-unit rotation-time calculating unit. The transfer unit includes an image carrier to which a toner image formed by developing an exposure-formed electrostatic latent image is transferred. The reflectance sensor is configured to measure reflectance of a background portion of the image carrier. The time-series data acquiring unit is configured to acquire time-series data with respect to the image carrier background-portion reflectance, measured by the reflectance sensor, as reference data over a time period twice longer than a time period that by design the image carrier requires for one cycle, and as advance/delay data over a time period twice longer than a time period longer or shorter in multiples of a predetermined time interval than the by-design time period. The transfer-unit rotation-time calculating unit is configured to calculate a one-cycle-time calculation value that is the time actually required for one cycle of the image carrier, based on the reference data and the advance/delay data acquired by the time-series data acquiring unit.

An image forming method of the disclosure is an image forming method performed by an image forming apparatus with a transfer unit including an image carrier whereby a toner image formed by an exposure-formed electrostatic latent image being developed is transferred. The image forming method includes: acquiring time-series data with respect to reflectance of a background portion of the image carrier, as reference data over a time period twice longer than a time period that by design the image carrier requires for one cycle, and as advance/delay data over a time period twice longer than a time period longer or shorter in multiples of a predetermined time interval than the by-design time period; and calculating a one-cycle-time calculation value that is the time actually required for one cycle of the image carrier, based on the acquired reference data and the acquired advance/delay data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates a transfer-unit calibration process according to the embodiment;

FIGS. 3A to 3C illustrate a difference-average-value calculating process according to the embodiment;

FIGS. 4A and 4B illustrate a one-cycle-time calculating process according to the embodiment;

FIG. 5 illustrates a working example of the disclosure;

DETAILED DESCRIPTION

Figure 1:
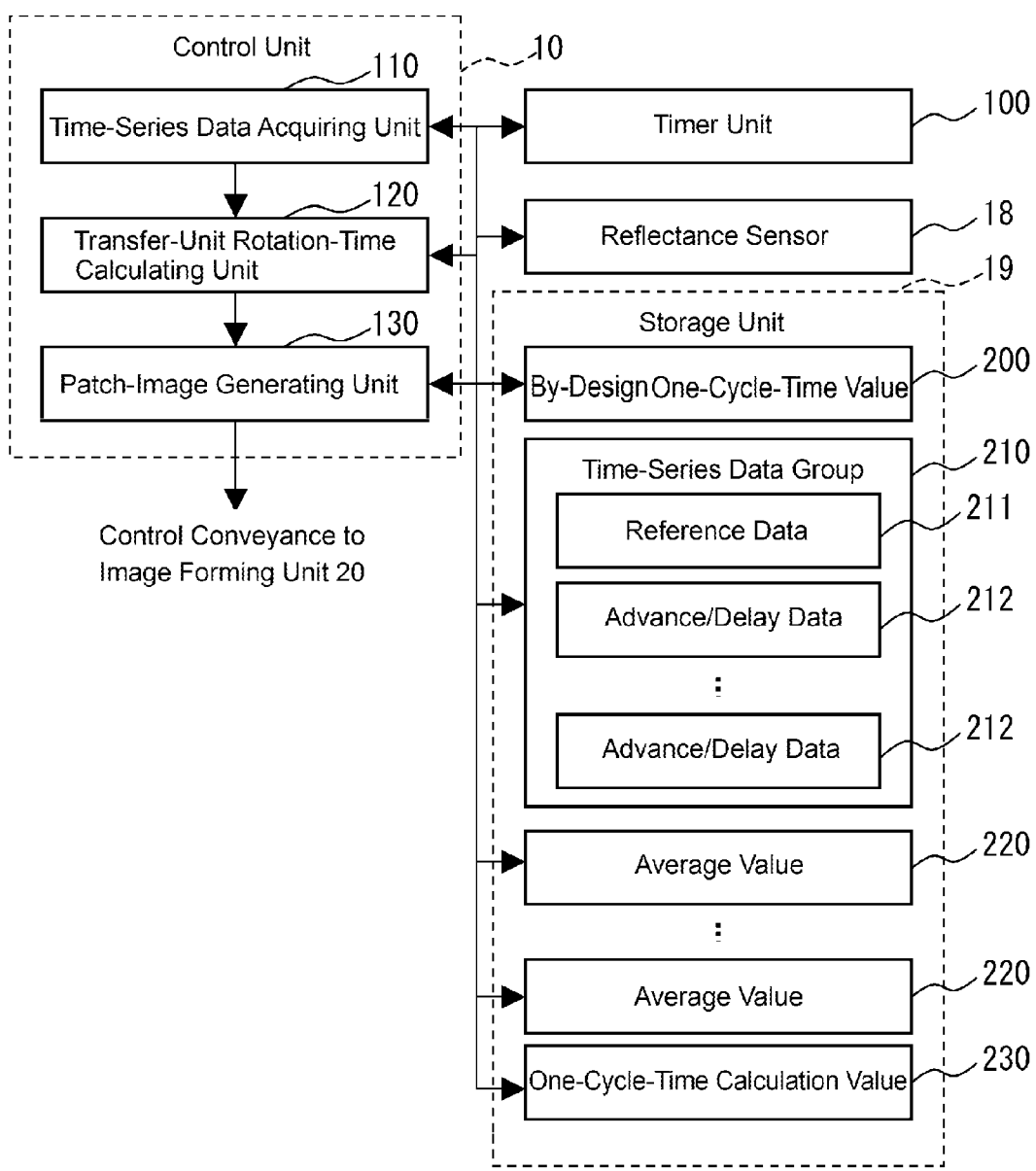
FIG. 1 illustrates a system configuration of an image forming apparatus according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Overall Configuration of Image Forming Apparatus 1 According to Embodiment

Figure 6:
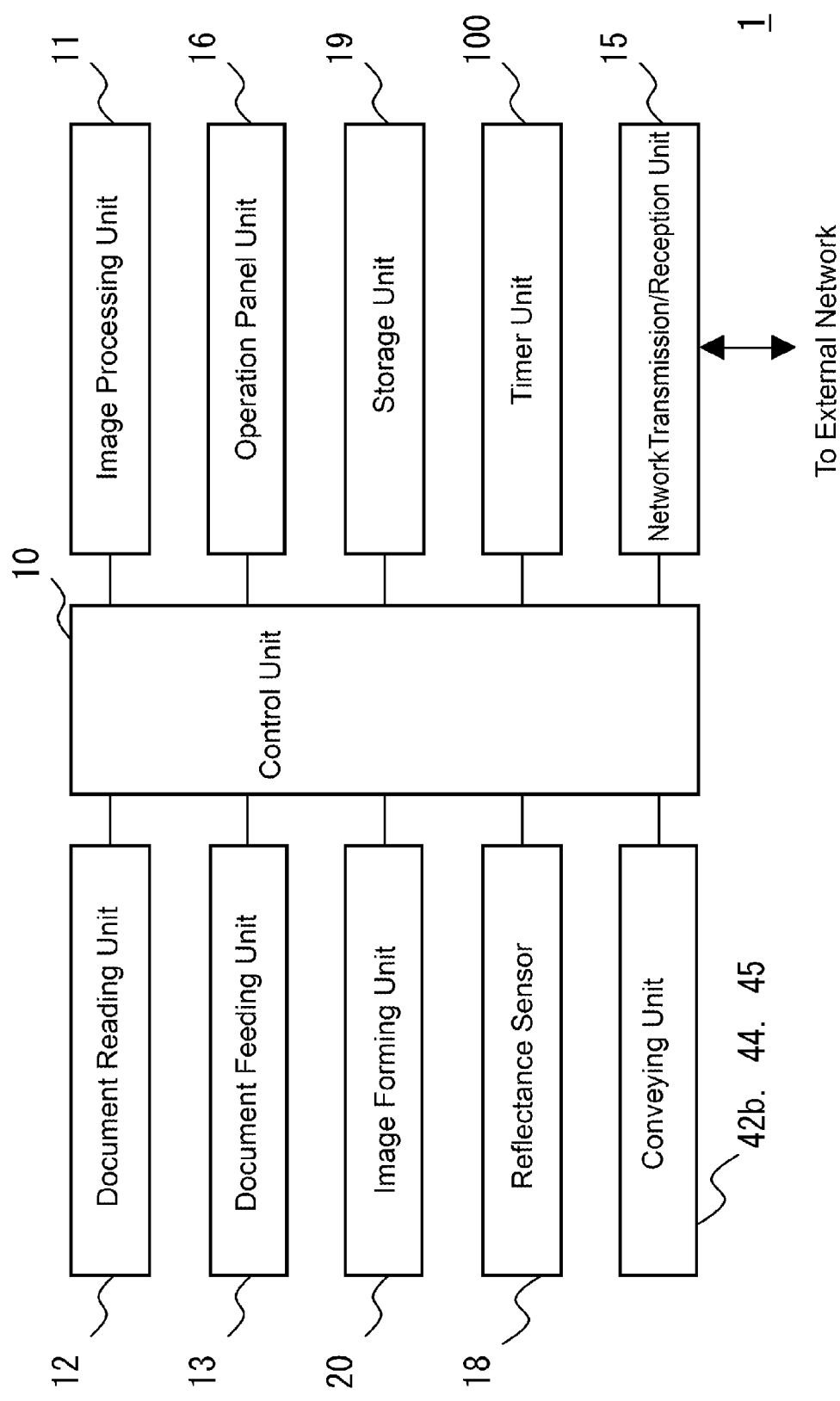
FIG. 6 illustrates the overall configuration of the image forming apparatus according to the embodiment.

Firstly, a description will be given of the overall configuration of an image forming apparatus 1 with reference to FIG. 6.

In the image forming apparatus 1, a control unit 10 connects to an image processing unit 11, a document reading unit 12, a document feeding unit 13, a conveying unit (a paper feed roller 42b, a conveyance roller pair 44, and a discharge roller pair 45), a network transmission/reception unit 15, an operation panel unit 16, a reflectance sensor 18, a storage unit 19, an image forming unit 20, and a timer unit 100. The operations of the respective units are controlled by the control unit 10.

The control unit 10 is an information processing unit such as a general purpose processor (GPP), a central processing unit (CPU), a micro processing unit (MPU), a digital signal processor (DSP), a graphics processing unit (GPU), and an application specific processor (ASIC). The control unit 10 reads a control program stored in a ROM or an HDD of the storage unit 19, uncompresses this control program in the RAM, and executes this control program. This causes the control unit 10 to operate as each unit of function blocks described later. The control unit 10 performs the control of the entire image forming apparatus 1 corresponding to predetermined instruction information that is input from an external terminal (not illustrated) or the operation panel unit 16.

The image processing unit 11 is an operation control unit such as a digital signal processor (DSP) and a graphics processing unit (GPU). The image processing unit 11 performs an image process on image data. For example, the image processing unit 11 performs image processes such as scaling, print density adjustment, gradation adjustment, and image improvement. The image processing unit 11 stores the image read by the document reading unit 12 as print data in the storage unit 19. At this time, the image processing unit 11 can also convert the print data into a file unit in a format such as a PDF and a TIFF.

The document reading unit 12 reads (scans) a set original document. The document feeding unit 13 conveys the original document to be read by the document reading unit 12. By an output command of a user, the image forming unit 20 performs image formation on a recording sheet based on the data that is stored in the storage unit 19, read by the document reading unit 12 or acquired from an external terminal. The reflectance sensor 18 is an optical sensor for calibration of an intermediate transfer belt 47 (see FIG. 8) of an intermediate transfer unit 40 in the image forming unit 20. Here, the respective operations of the document reading unit 12, the document feeding unit 13, the image forming unit 20, and the reflectance sensor 18 will be described later.

The network transmission/reception unit 15 is a network connection unit that includes a LAN board, a wireless transceiver, and similar unit for connecting to an external network such as a LAN, a wireless LAN, a WAN, and a mobile phone network. The network transmission/reception unit 15 transmits and receives data through a data communication line and transmits and receives a voice signal through a voice-grade telephone line.

The operation panel unit 16 includes a display unit such as an LCD and an input unit such as: a numeric keypad; a start key; a cancel key; a key for switching operation modes such as copy, FAX transmission, and scanner; a key for issuing an instruction for execution of a job related to printing, transmission, storage, recording, or similar operation of a selected document and a touch panel. The operation panel unit 16 acquires the instructions of various jobs of the image forming apparatus 1 from a user. Additionally, the control unit 10 can store device settings of the image forming apparatus 1 and/or information of each user in the storage unit 19 or can change the information stored in the storage unit 19 based on the instruction of the user acquired from the operation panel unit 16.

The storage unit 19 is a storage unit that employs a semiconductor memory such as a read only memory (ROM) and a random access memory (RAM), or a recording medium such as a hard disk drive (HDD). The ROM and the HDD in the storage unit 19 store control programs for performing the operation control of the image forming apparatus 1. In addition, the storage unit 19 stores account setting of the user. The storage unit 19 may include a region for a storage folder for every user.

The timer unit 100 is, for example, a real-time clock with a battery backup function and/or a circuit that measures time by counting a clock of the control unit 10. For example, the timer unit 100 can measure a time per several microseconds to one second based on the clock supplied from a crystal oscillator circuit or similar circuit (not illustrated) provided separately from the circuit for the control unit 10. The timer unit 100 can be set as an interval timer that causes interruption or similar process at a predetermined interval of several microseconds to one second.

In the image forming apparatus 1, the control unit 10 and the image processing unit 11 may be integrally formed like a GPU Built-in CPU or a chip-on-module package. The control unit 10 and the image processing unit 11 may each incorporate a RAM, a ROM, a flash memory, or similar member. The image forming apparatus 1 may include a FAX transmission/reception unit for transmission to and reception from a facsimile.

Operation of Image Forming Apparatus 1

Next, a description will be given of the operation of the image forming apparatus 1 according to the embodiment of the disclosure with reference to FIG. 7. The image forming apparatus 1 includes a main unit 14, the document reading unit 12, the document feeding unit 13, and similar member. The document reading unit 12 is arranged above the main unit 14. The document feeding unit 13 is arranged above the document reading unit 12. A discharge port 41 is formed in the main unit 14. At the discharge port 41 side of the main unit 14, a stack tray 60 is arranged. The operation panel unit 16 is arranged at the front side of the main unit 14.

The document reading unit 12 includes a scanner 12a, a platen glass 12b, and a document reading slit 12c. The scanner 12a includes an exposing lamp and an imaging sensor such as a charge coupled device (CCD) and a complementary metal oxide semiconductor (CMOS). The scanner 12a can move in the conveyance direction of the original document by the document feeding unit 13. The platen glass 12b is a platen formed of a transparent member such as glass. The document reading slit 12c has a slit formed in a direction perpendicular to the conveyance direction of the original document by the document feeding unit 13.

To read the original document placed on the platen glass 12b, the scanner 12a is moved to the position facing the platen glass 12b. Subsequently, the scanner 12a acquires image data by reading the original document while scanning the original document placed on the platen glass 12b. Subsequently, the scanner 12a outputs the acquired image data to the control unit 10 (see FIG. 6) provided in the main unit 14. To read the original document conveyed by the document feeding unit 13, the scanner 12a is moved to the position facing the document reading slit 12c. Subsequently, the scanner 12a acquires image data through the document reading slit 12c by reading the original document in synchronization with the conveying operation of the original document by the document feeding unit 13. Subsequently, the scanner 12a outputs the acquired image data to the control unit 10.

The document feeding unit 13 includes a document placement unit 13a, a document discharging unit 13b, and a document conveying mechanism 13c. The original document placed on the document placement unit 13a is sequentially fed one by one by the document conveying mechanism 13c, conveyed to the position facing the document reading slit 12c, and then discharged to the document discharging unit 13b. Here, the document feeding unit 13 can be lifted up around the rotation axis (not illustrated). Lifting up the document feeding unit 13 ensures opening the top surface of the platen glass 12b.

The main unit 14 includes the image forming unit 20, the intermediate transfer unit 40, and a fixing unit 50, and also includes a paper sheet feeder 42, a paper sheet conveyance passage 43, the conveyance roller pair 44, and the discharge roller pair 45. The paper sheet feeder 42 includes a plurality of sheet feed cassettes 42a and a plurality of paper feed rollers 42b. The sheet feed cassettes 42a store respective recording sheets having different sizes or orientations. The paper feed roller 42b feeds the recording sheet one by one to the paper sheet conveyance passage 43 from the sheet feed cassette 42a. The paper feed roller 42b, the conveyance roller pair 44, and the discharge roller pair 45 function as a conveying unit. The recording sheet is conveyed by this conveying unit. The recording sheet, which is fed to the paper sheet conveyance passage 43 by the paper feed roller 42b, is conveyed toward the intermediate transfer unit 40 by the conveyance roller pair 44.

The image forming unit 20 performs, for example, image formation of color toner image on a recording sheet. The recording sheet after recording by the image forming unit 20 is discharged to the stack tray 60 by the discharge roller pair 45.

Figure 8:
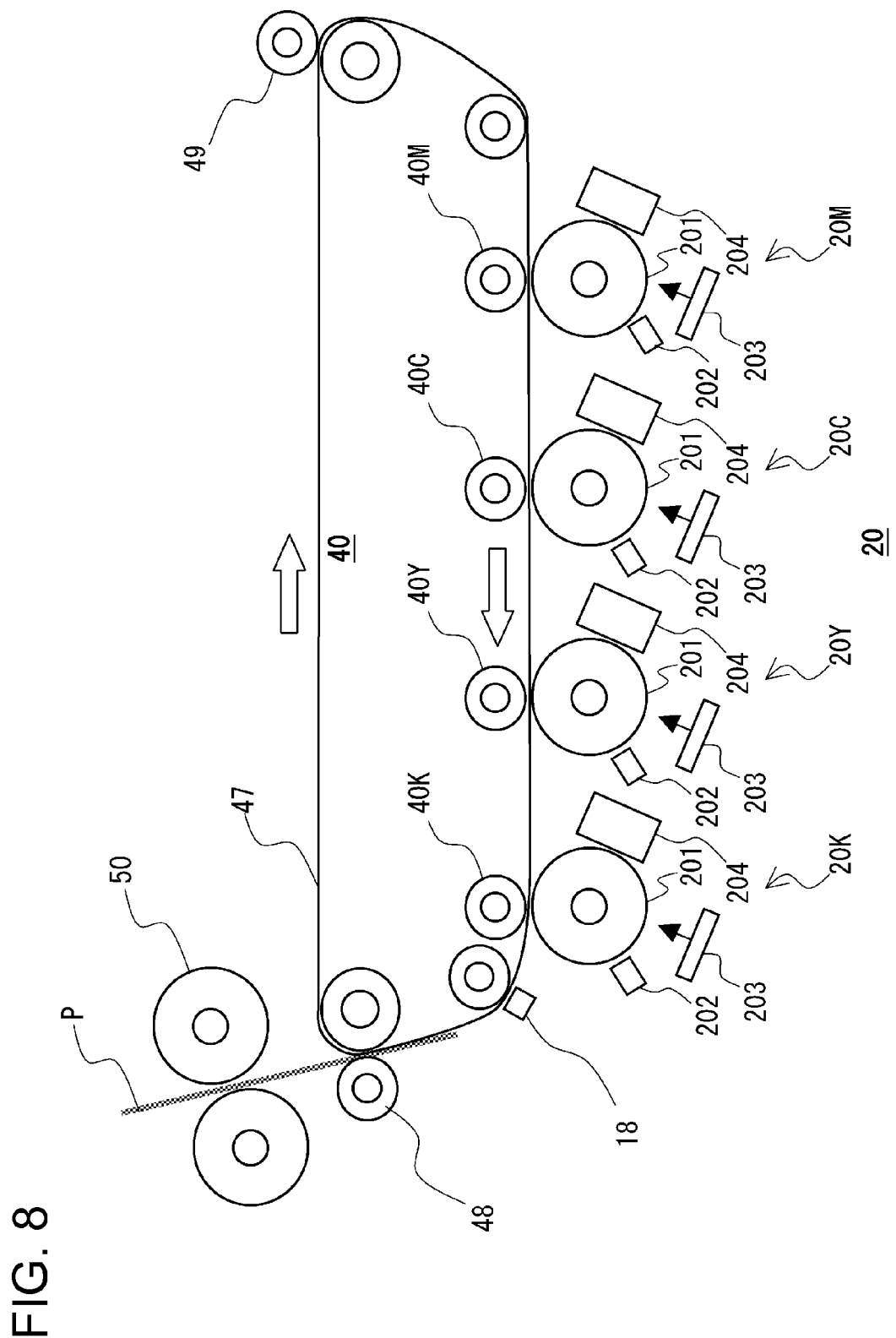
FIG. 8 illustrates an image forming unit of the image forming apparatus according to the embodiment.

With reference to FIG. 8, the detailed configuration of the image forming unit 20 will be described. The image forming unit 20 includes an image forming unit 20M, an image forming unit 20C, an image forming unit 20Y, and an image forming unit 20K corresponding to respective four colors of magenta (M), cyan (C), yellow (Y), and black (K or B).

The respective configurations of the image forming unit 20M, the image forming unit 20C, the image forming unit 20Y, and the image forming unit 20K are the same. Therefore, only the image forming unit 20K will be described. In the approximately center of the image forming unit 20K, a photoreceptor drum 201 is arranged. In the peripheral area of the photoreceptor drum 201, a charging unit 202, an exposing unit 203, a developing unit 204, and a photoreceptor-drum cleaning unit (not illustrated) are arranged in this order along the rotation direction of the photoreceptor drum 201. The charging unit 202 charges the circumference surface of the photoreceptor drum 201 at a predetermined electric potential. The exposing unit 203 performs scanning and exposure on the charged circumference surface of the photoreceptor drum 201 using a laser beam modulated based on the image data transmitted from the document reading unit 12 and similar unit so as to form an electrostatic latent image on the circumference surface of the photoreceptor drum 201. The developing unit 204 develops the electrostatic latent image formed on the circumference surface of the photoreceptor drum 201 using toner so as to form a toner image on the circumference surface of the photoreceptor drum 201. The photoreceptor-drum cleaning unit removes the toner remaining on the circumference surface of the photoreceptor drum 201 from the circumference surface of the photoreceptor drum 201 after a primary transfer described later.

The intermediate transfer unit 40 includes a primary transfer roller 40M, a primary transfer roller 40C, a primary transfer roller 40Y, and a primary transfer roller 40K that correspond to the respective image forming units. The intermediate transfer unit 40 further includes the intermediate transfer belt 47 (image carrier), a secondary transfer roller 48, and a cleaner 49. The primary transfer roller 40M, the primary transfer roller 40C, the primary transfer roller 40Y, and the primary transfer roller 40K perform primary transfer of the toner images in respective colors formed on the respective photoreceptor drums 201 corresponding to the image forming unit 20M, the image forming unit 20C, the image forming unit 20Y, and the image forming unit 20K such that the respective toner images are superimposed on one another on the intermediate transfer belt 47. The secondary transfer roller 48 performs secondary transfer of the toner image transferred to the intermediate transfer belt 47 by the primary transfer on a recording sheet P. The cleaner 49 removes the toner attached onto the intermediate transfer belt 47 after the secondary transfer. The intermediate transfer belt 47 is driven by a roller to cause movement in the direction, for example, by an outlined arrow illustrated in the drawing.

The fixing unit 50 heats the recording sheet P on which the toner image is transferred by the intermediate transfer unit 40 so as to fix the toner image to the recording sheet.

The reflectance sensor 18 is an optical sensor for optically measuring the reflectance of the intermediate belt or similar member with infrared in the portion where the toner image is not transferred to the intermediate transfer belt 47 of the intermediate transfer unit 40, that is, on a "background." Here, the reflectance sensor 18 may be used to measure the print density of the toner image transferred to the intermediate transfer belt 47 for correction of the image density. For example, the reflectance sensor 18 continuously measures the reflectance of the intermediate transfer belt 47 in actual time (real time). The reflectance sensor 18 may perform real-time measurement of the reflectances in a plurality of positions facing the driving direction of the intermediate transfer belt 47 so as to calculate the average value or similar parameter of the reflectances.

System Configuration of Image Forming Apparatus 1

With reference to FIG. 1, the system configuration of the image forming apparatus 1 will be described. The image forming apparatus 1 includes, as functions of the control unit 10, a time-series data acquiring unit 110, a transfer-unit rotation-time calculating unit 120, and a patch-image generating unit 130. The storage unit 19 stores a by-design one-cycle-time value 200 and a one-cycle-time calculation value 230. Additionally, the storage unit 19 can store a time-series data group 210 and an average value 220, and overwrite the stored contents. Further, the storage unit 19 can overwrite and store the one-cycle-time calculation value 230.

The time-series data acquiring unit 110 performs an operation for acquiring the time-series data of the reflectance of the background portion of the intermediate transfer belt 47 measured by the reflectance sensor 18 over the by-design one-cycle-time value 200 twice in a row. Additionally, the time-series data acquiring unit 110 performs an operation for acquiring the time-series data of the reflectance of the background portion of the intermediate transfer belt 47 over a time longer than the by-design one-cycle-time value 200 in multiples of the predetermined period twice in a row. Further, the time-series data acquiring unit 110 performs an operation for acquiring the time-series data of the reflectance of the background portion of the intermediate transfer belt 47 over a time shorter than the by-design one-cycle-time value 200 in multiples of the predetermined period twice in a row. Here, the time longer than the by-design one-cycle-time value 200 in multiples of the predetermined period means the by-design one-cycle-time value 200+$\Delta$t, the by-design one-cycle-time value 200+2$\Delta$t, the by-design one-cycle-time value 200+3$\Delta$t, and similar time. The time shorter than the by-design one-cycle-time value 200 in multiples of the predetermined period means the by-design one-cycle-time value 200−$\Delta$t, the by-design one-cycle-time value 200−2$\Delta$t, the by-design one-cycle-time value 200−3$\Delta$t, and similar time. Here, the time-series data of the reflectance of the background portion of the intermediate transfer belt 47 obtained by performing the operation for acquiring the time-series data of the reflectance over the by-design one-cycle-time value 200 twice in a row is referred to as reference data. The time-series data of the reflectance of the background portion of the intermediate transfer belt 47 obtained by measuring the time-series data of the reflectance over another time is referred to as advance/delay data. That is, the time-series data acquiring unit 110 acquires the time-series data group 210 that includes the reference data and the advance/delay data.

The transfer-unit rotation-time calculating unit 120 uses the time-series data group 210 acquired by the time-series data acquiring unit 110 to calculate the one-cycle-time calculation value 230. Here, the reference data and the advance/delay data each include data A and data B. In the two measurements in a row, the data A is time-series data of the reflectance of the background portion of the intermediate transfer belt 47 obtained in the first measurement, and the data B is time-series data of the reflectance of the background portion of the intermediate transfer belt 47 obtained in the second measurement. For each of reference data 211 and respective pieces of advance/delay data 212, the transfer-unit rotation-time calculating unit 120 calculates the difference between the data A (reflectance) and the data B (reflectance) using the time-series data obtained by the measurement performed twice in a row. Subsequently, the transfer-unit rotation-time calculating unit 120 calculates the average value 220 of the differences for each of the reference data 211 and the respective pieces of the advance/delay data 212. Subsequently, the transfer-unit rotation-time calculating unit 120 calculates the time when the calculated average value 220 of the differences between the reflectances becomes minimum, for example, the by-design one-cycle-time value 200−2Δt as the one-cycle-time calculation value 230.

The patch-image generating unit 130 forms a patch image for image density calibration. The patch-image generating unit 130 adjusts the timing for forming the patch image based on the one-cycle-time calculation value 230 calculated by the transfer-unit rotation-time calculating unit 120 so as to accurately form a patch image for image density calibration in a desired position on the intermediate transfer belt 47. This can accurately remove the influence of the reflectance (background optical density) of the background portion in the image density calibration. Here, the background optical density of the intermediate transfer belt 47 is different by position on the intermediate transfer belt 47. Therefore, if the one-cycle-time calculation value 230 that is the time required for one cycle of the intermediate transfer belt 47 (image carrier) is not accurately obtained, the patch image cannot be formed in an intended position on the intermediate transfer belt 47. That is, the background optical density of the intermediate transfer belt 47 in the position where the patch image is to be formed cannot be accurately obtained. Thus, the image density calibration cannot be performed with high accuracy.

The by-design one-cycle-time value 200 corresponds to the by-design time period required for one cycle of the intermediate transfer belt 47. The by-design one-cycle-time value 200 is calculated from the by-design perimeter and the by-design speed of the intermediate transfer belt 47. The by-design one-cycle-time value 200 may be stored in the storage unit 19, for example, at the time of factory shipment or replacement of the intermediate transfer unit 40.

The time-series data group 210 is data obtained such that the measured reflectance by the reflectance sensor 18 in the background portion of the intermediate transfer belt 47 of the intermediate transfer unit 40 or similar parameter is acquired by the time-series data acquiring unit 110 at a predetermined interval during a predetermined period. The time-series data acquiring unit 110 may acquire, for example, data sampled at an interval of several msec to several tens msec as the time-series data group 210.

The average value 220 is calculated regarding the reference data 211 and the respective pieces of the advance/delay data 212, and is data of the average value of the differences among the reflectances at the respective sampling points of the time-series data (data A) obtained in the first measurement and the time-series data (data B) obtained in the second measurement. Here, the average value 220 is not a simple arithmetic average, and may be calculated as an average value of the absolute values of the differences, an average value of the squared differences, and a value related to a statistical average such as dispersion and median.

The one-cycle-time calculation value 230 is an actual time required for one cycle of the intermediate transfer belt 47 of the intermediate transfer unit 40 calculated by the transfer-unit rotation-time calculating unit 120. The one-cycle-time calculation value 230 is the half time of the measurement time used for obtaining the reference data 211 or the advance/delay data 212 in which this average value 220 becomes minimum, for example, the by-design one-cycle-time value 200−2Δt.

Here, the control unit 10 of the image forming apparatus 1 executes the control program stored in the storage unit 19 so as to function as the time-series data acquiring unit 110, the transfer-unit rotation-time calculating unit 120, and the patch-image generating unit 130. The respective units of the above-described image forming apparatus 1 are hardware resources for performing an image forming method of the disclosure.

Transfer-Unit Calibration Process by Image Forming Apparatus 1

The following describes a transfer-unit calibration process by the image forming apparatus 1 according to the embodiment of the disclosure with reference to FIG. 2 to FIGS. 4A and 4B. In the transfer-unit calibration process of this embodiment, the time-series data group 210 of the reflectance of the background of the intermediate transfer belt 47 of the intermediate transfer unit 40 is acquired while the time set in the timer unit 100 is shifted in multiples of a predetermined period. Then, the average value 220 of the differences is calculated to calculate the time of the timer unit 100 when this average value 220 becomes minimum as the one-cycle-time calculation value 230 that is the time actually required for one cycle of the intermediate transfer belt 47 of the intermediate transfer unit 40. The transfer-unit calibration process in this embodiment is executed such that the control unit 10 mainly executes the program stored in the storage unit 19 in collaboration with the respective units using the hardware resources. The following describes the detail of the transfer-unit calibration process for each step with reference to a flow chart in FIG. 2.

Step S101

Firstly, the time-series data acquiring unit 110 in the control unit 10 performs a measurement starting process. The time-series data acquiring unit 110 initializes the respective units to start the driving of the intermediate transfer belt 47 of the intermediate transfer unit 40, so as to ensure a state where the reflectance sensor 18 can measure the reflectance. Subsequently, the time-series data acquiring unit 110 waits for the rotation speed of the intermediate transfer belt 47 of the intermediate transfer unit 40 to reach a predetermined speed, and then causes the process to proceed to step S102.

Step S102

Subsequently, the time-series data acquiring unit 110 performs a timer setting process. The time-series data acquiring unit 110 sets the by-design one-cycle-time value 200 or the times longer or shorter than the by-design one-cycle-time value 200 by the predetermined period to the timer unit 100. The time-series data acquiring unit 110 sets these times longer or shorter by the predetermined period corresponding to a predetermined number of changes described later. For example, the time-series data acquiring unit 110 changes the by-design one-cycle-time value 200 by ±nΔt time (n=0, 1, 2, 3, ..., N) as these times longer or shorter by the predetermined period. This Δt time can be set in several msec to several tens msec. The maximum value N of n in the ±nΔt time is the maximum value for the number of changes of the Δt time. The maximum value N can be set to a predetermined number based on, for example, the dispersion of displacement of the length of the intermediate transfer belt 47 of the intermediate transfer unit 40 or similar parameter. The time-series data acquiring unit 110 may set the number of change of, for example, about ±Δt. Here, the time when n=0 corresponds to the time of the by-design one-cycle-time value 200. For example, when n=±2, the time-series data acquiring unit 110 sets the time period twice longer than the time of the by-design one-cycle-time value 200+2Δt to the timer unit 100. This is because performing the measurement over the by-design one-cycle-time value 200+2Δt twice in a row shows that when the time-series data of the reflectance of the background portion of the intermediate transfer belt 47 obtained in the first measurement coincides with the time-series data of the reflectance of the background portion of the intermediate transfer belt 47 obtained in the second measurement, the half time of the time of this measurement, for example, the by-design one-cycle-time value 200+2Δt is the time actually required for one cycle of the intermediate transfer belt 47.

Step S103

Subsequently, the time-series data acquiring unit 110 performs a time-series-data acquiring process. The time-series data acquiring unit 110 acquires the measurement data of the reflectance from the reflectance sensor 18 at a predetermined interval using the interval timer of the timer unit 100 or similar unit, and stores the acquired measurement data as the time-series data group 210 in the storage unit 19.

Step S104

Subsequently, the time-series data acquiring unit 110 determines whether or not the time (for example, the time period twice longer than the time of the by-design one-cycle-time value 200+2Δt) set in the timer unit 100 has passed. The time-series data acquiring unit 110 makes a determination of Yes when the time set in the timer unit 100 has passed and a predetermined number of samplings have been completed. Otherwise, the time-series data acquiring unit 110 makes a determination of No. In the case of Yes, the time-series data acquiring unit 110 causes the process to proceed to step S105. In the case of No, the time-series data acquiring unit 110 returns the process to step S103 and continues acquiring the time-series data group 210.

Step S105

When the time set in the timer unit 100 has passed, the transfer-unit rotation-time calculating unit 120 in the control unit 10 determines whether or not the acquisition of all the time-series data has been completed. In the example described above, the transfer-unit rotation-time calculating unit 120 makes a determination of Yes when the reference data 211 and the advance/delay data 212 that is changed up to N as the maximum value for the number of changes of the Δt time are acquired. Otherwise, the transfer-unit rotation-time calculating unit 120 makes a determination of No. In the case of Yes, the transfer-unit rotation-time calculating unit 120 causes the process to proceed to step S106. In the case of No, the transfer-unit rotation-time calculating unit 120 returns the process to step S102. After the process returns to step S102, the time-series data acquiring unit 110 sets the time period twice longer than the time longer or shorter than the by-design one-cycle-time value 200 by the predetermined period to the timer unit 100, and continues the acquisition of the time-series data that becomes the advance/delay data 212. As the time with advance or delay by the predetermined period, for example, n in the ±nΔt time is increased.

Step S106

When the acquisition of all the time-series data has been completed, the transfer-unit rotation-time calculating unit 120 performs a difference-average-value calculating process. The transfer-unit rotation-time calculating unit 120 calculates the average value 220 of the differences between data (the reflectance of the background portion of the intermediate transfer belt 47: the data A) of the sampling points obtained in the first measurement and data (the data B) of the sampling points obtained in the second measurement regarding the reference data 211 and the respective pieces of the advance/delay data 212. By the description with reference to the example in FIGS. 3A to 3C, regarding the data A and the data B, the transfer-unit rotation-time calculating unit 120 calculates the differences of the data in the respective sampling points and then averages the differences. For example, the data in the respective sampling points of the data A is defined as S1[i] (i=1, 2, 3, ..., m). The data in the respective sampling points of the data B is defined as S2[i] (i=1, 2, 3, ..., m). Here, m has the same value in the data A and the data B since the data is acquired at the same predetermined sampling interval during the same measurement time. In this case, an average value AVE of the differences between the data A and the data B is, for example, calculated with the following formula (1). Here, in the examples of FIGS. 3A to 3C and FIGS. 4A and 4B described later, the data A and the data B are described as sine waves. However, this should not be construed in a limiting sense. The data A and the data B each have a waveform containing a specific pattern and an error based on the configurations of the intermediate transfer belt 47 and similar member of the intermediate transfer unit 40.

Formula 1

$$AVE = \left( \sum_{i=1}^{m} S1[i] - S2[i] \right) \div m \qquad \text{Formula 1}$$

The transfer-unit rotation-time calculating unit 120 calculates the average value AVE of the time-series data regarding the reference data 211 and the respective pieces of the advance/delay data 212 at ±nΔt times with the above-described formula (1), and stores these values of the average value AVE as the respective average values 220 in the storage unit 19.

Step S107

Figure 4A:
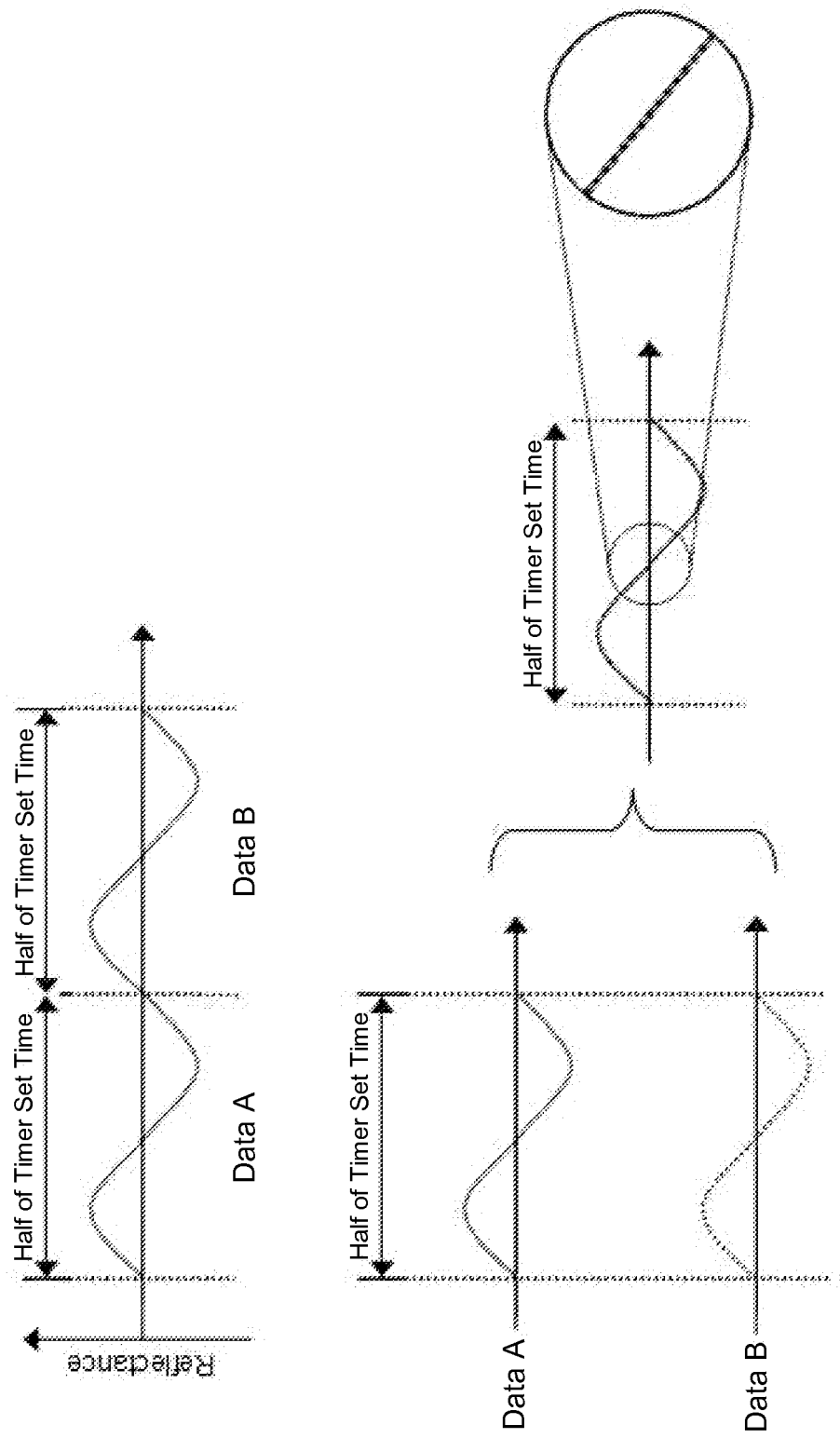

Subsequently, the transfer-unit rotation-time calculating unit 120 performs a one-cycle-time calculating process. The transfer-unit rotation-time calculating unit 120 calculates the one-cycle-time calculation value 230 based on the respective average values 220 corresponding to the reference data 211 and the advance/delay data 212 acquired by the time-series data acquiring unit 110. By the description with reference to FIGS. 4A and 4B, in the example of FIG. 4A, if the half time of the time set to the timer unit 100 and the time actually required for one cycle of the intermediate transfer belt 47 coincide with each other, the cycle of the data A and the cycle of the data B are supposed to coincide with each other. However, as illustrated in the example of FIG. 4B, actually, since the intermediate transfer belt 47 expands due to the temperature and varies due to the variation in tolerance, these cycles rarely coincide with each other. Accordingly, the transfer-unit rotation-time calculating unit 120 calculates the time when the average value 220 of the difference between the data A and the data B calculated in the difference-average-value calculating process described above becomes minimum as the one-cycle-time calculation value 230, which is the time actually required for one cycle of the intermediate transfer belt 47. This one-cycle-time calculation value 230 is the time actually required for one cycle of the intermediate transfer belt 47.

Step S108

Subsequently, the patch-image generating unit 130 in the control unit performs a patch-image generating process. The patch-image generating unit 130 adjusts the timing such that a toner image is transferred in a predetermined position on the intermediate transfer belt 47 based on the one-cycle-time calculation value 230 calculated by the transfer-unit rotation-time calculating unit 120. Additionally, the patch-image generating unit 130 forms a patch image for image density calibration, and transfers the patch image to the intermediate transfer belt 47. Accordingly, the patch image is formed always in the same portion on the intermediate transfer belt 47. Then, the transfer-unit calibration process according to the embodiment of the disclosure is terminated.

The above-described configuration can obtain the following effects. Typically, when the reference position marks are used in calibration for measuring the length of the intermediate transfer belt of the transfer unit, there is the need for the member to mark the reference position, thus costing money.

In contrast, the image forming apparatus 1 according to the embodiment of the disclosure includes the intermediate transfer unit 40 that includes the intermediate transfer belt 47 (image carrier) to which a toner image formed by developing an exposure-formed electrostatic latent image is transferred. The image forming apparatus 1 further includes the reflectance sensor 18, the time-series data acquiring unit 110, the transfer-unit rotation-time calculating unit 120, and the patch-image generating unit 130. The reflectance sensor 18 measures the reflectance of the background portion of the image carrier. The time-series data acquiring unit 110 acquires the time-series data group 210 of the reflectance of the background portion of the image carrier measured by the reflectance sensor 18 as the reference data 211 over the time period twice longer than the by-design time period (the by-design one-cycle-time value 200) required for one cycle of the image carrier and as the advance/delay data 212 over the time period twice longer than the time longer in multiples of the predetermined period or shorter in multiples of the predetermined period than the by-design time period. The transfer-unit rotation-time calculating unit 120 calculates the one-cycle-time calculation value 230, which is the time actually required for one cycle of the image carrier, based on the time-series data group 210 including the reference data 211 and the advance/delay data 212 acquired by the time-series data acquiring unit 110. The patch-image generating unit 130 performs the correction on the timing for forming a patch image based on the one-cycle-time calculation value 230, which is calculated by the transfer-unit rotation-time calculating unit 120. This configuration can perform the correction on the time without using a special member like the reference position mark, thus saving the cost. Additionally, the time actually required for one cycle of the intermediate transfer belt 47 of the intermediate transfer unit 40 can be accurately calculated without the reference mark. This causes an increase in accuracy of the calibration. Additionally, when the intermediate transfer unit 40 performs a meander correction control on the intermediate transfer belt 47, the elimination of the reference mark can prevent erroneous detection in a belt-end detecting unit (not illustrated) that determines a meandering state of the transfer belt.

The image forming apparatus 1 according to the embodiment of the disclosure calculates the differences of the respective reflectances regarding the data A and the data B. The data A is the time-series data obtained in the first measurement in the two measurements in a row. The data B is the time-series data obtained in the second measurement in the two measurements in a row. Then, the image forming apparatus 1 calculates the time actually required for one cycle of the intermediate transfer belt 47 based on the time when the average value 220 of the calculated differences of the reflectances becomes minimum. This configuration can accurately calculate the time (the one-cycle-time calculation value 230) actually required for one cycle of the intermediate transfer belt 47 of the intermediate transfer unit 40 even when the measured value of the reflectance by the reflectance sensor 18 contains noise, an error, or similar component.

Typically, when the by-design length for one cycle of the intermediate transfer belt is different from the actual length of the intermediate transfer belt, the position of the intermediate transfer belt on which the patch image for the image density calibration is formed is different from the desired position. Thus, typically, due to the difference in background optical density depending on the position on the intermediate transfer belt, a problem arises in that the calibration for image density considering background optical density cannot be accurately performed and an error occurs in the calibration for image density.

In contrast, the image forming apparatus 1 according to the embodiment of the disclosure can form the patch image for the image density calibration in the same portion where the background optical density is measured on the intermediate transfer belt 47, using the one-cycle-time calculation value 230, which is the time actually required for one cycle of the intermediate transfer belt 47. This can improve the accuracy of the image density calibration.

WORKING EXAMPLE

By referring to FIG. 5, assuming that the intermediate transfer belt 47 of the intermediate transfer unit 40 has a perimeter of 936.2 mm, a product tolerance of ±1 mm, and a variation due to temperature of ±1 mm/10° C., and the speed of the intermediate transfer belt 47 is 266.7 [mm/s], the time for one cycle of the intermediate transfer belt 47 of the intermediate transfer unit 40 can be calculated as follows:

$$Tb = 936.2 \text{ mm} \div 266.7 \text{ [mm/s]} = 3.510 \text{ [s]}$$

Using this Tb as the by-design one-cycle-time value 200, the time period twice longer than the by-design one-cycle-time value 200 is set in the timer unit 100. The second measurement over the one-cycle-time calculation value 230 is performed in a row after the first measurement over the one-cycle-time calculation value 230. Then, from the start of the first measurement of the intermediate transfer belt 47 of the intermediate transfer unit 40, the reflectance of the background is acquired by the reflectance sensor 18 every 1.25 ms, so as to store the first data as the data A of the reference data 211 in the storage unit 19. Afterward, similarly, the second data is stored as the data B of the reference data 211 in the storage unit 19. Subsequently, as the ±nΔt time (n=1, ..., 3), the setting of the timer unit 100 is changed from Tb−3Δt to Tb+3Δt and then the reflectance of the background is acquired (the data A and the data B of the advance/delay data 212 are acquired) every 1.25 ms. The data thus acquired is stored as the data A and the data B of the advance/delay data 212 in the storage unit 19. The respective average values AVE of the differences between the data A and the data B included in the reference data 211 and the respective pieces of the advance/delay data 212 are calculated. The by-design one-cycle-time value 200 or the time ±nΔt with respect to the by-design one-cycle-time value 200 corresponding to the minimum average value among the calculated average values AVE is calculated as the one-cycle-time calculation value 230. For example, like the table of FIG. 5, as the result of acquiring the average values of AVE1 to AVE7, assuming that AVE3 is minimum, the one-cycle-time calculation value 230 is Tb−Δt.

The control unit 10 can use the time-series data group 210 of the reflectance sensor 18 to detect the value exceeding a predetermined threshold value or detect a specific pattern or similar parameter, so as to detect failure due to burnout or breakage of the intermediate transfer belt 47 of the intermediate transfer unit 40. This ensures both the calibration and the failure detection, thus saving the maintenance cost of the image forming apparatus 1.

Figure 7:
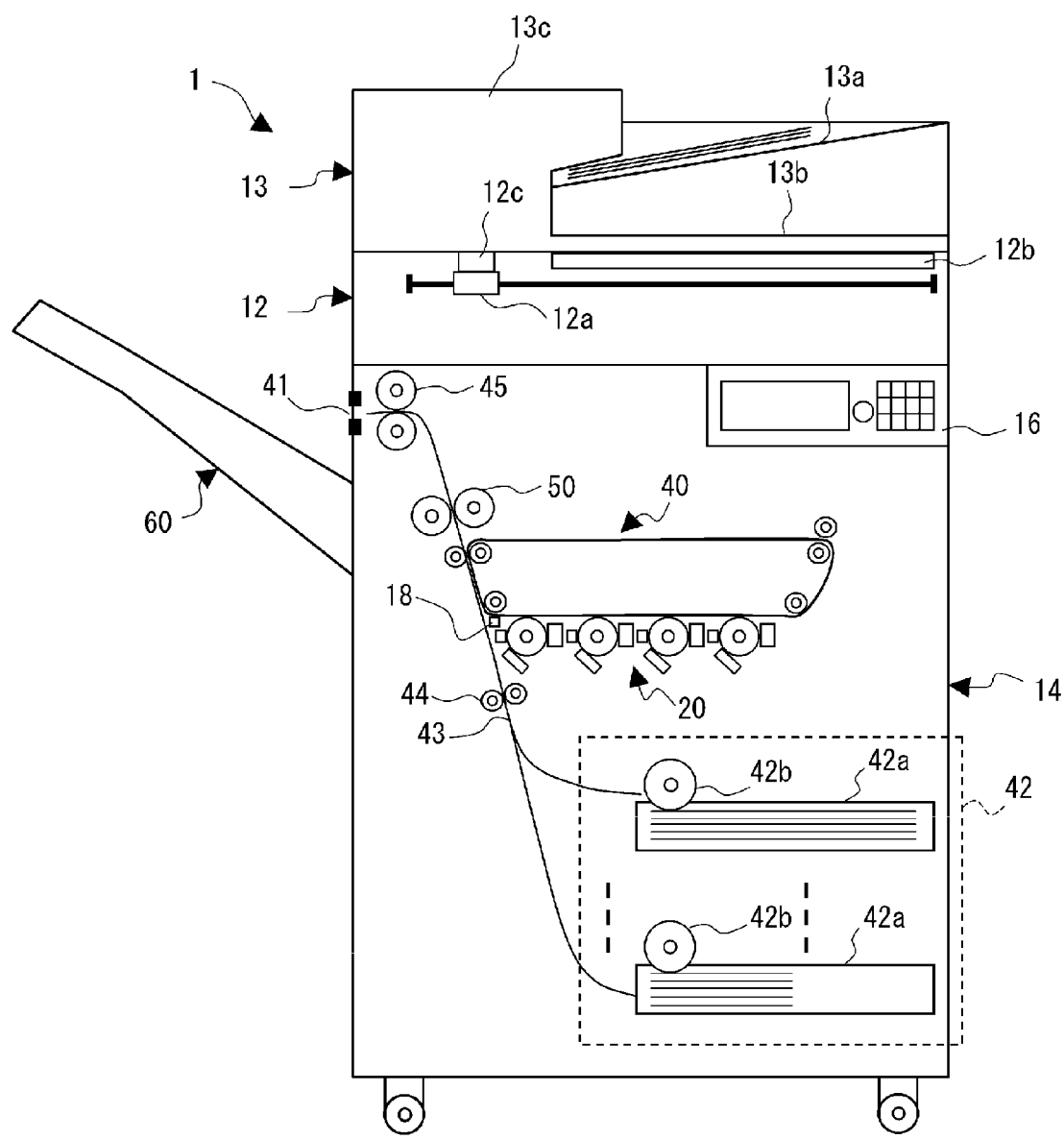
FIG. 7 illustrates the image forming apparatus according to the embodiment.

While the above-described embodiment has been described such that the toner images are superimposed in a tandem manner on the intermediate transfer belt 47 of the intermediate transfer unit 40 as illustrated in FIG. 7 and FIG. 8, it is possible to use an intermediate transfer belt in any structure or similar member. Alternatively, the configuration may employ a drum for intermediate transfer or similar member. Alternatively, the configuration may employ a developing unit with a rotary structure. The disclosure is applicable to the calibration of an image forming apparatus that does not form color images but includes the intermediate transfer unit 40 for performing intermediate transfer. While the above-described embodiment has been described such that the built-in reflectance sensor 18 is provided, a possible configuration is that a serviceman externally mounts the reflectance sensor 18 on the intermediate transfer unit 40 at the time of calibration.

The disclosure is applicable to an information processing apparatus other than the image forming apparatus except the multi-functional peripheral. That is, a single-function printer or similar printer may be used.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
    a transfer unit including a rotating image carrier onto which a toner image formed by developing an exposure-formed electrostatic latent image is transferred, the rotating image carrier by design having a single-circuit cycling time;
    a reflectance sensor configured to measure reflectance of a background portion of the image carrier;
    a time-series data acquiring unit configured to acquire, at predetermined time intervals, and independent of rotational position of the image carrier, time-series data with respect to the image carrier background-portion reflectance, measured by the reflectance sensor, as reference data over a time period twice longer than the by-design single-circuit cycling time of the image carrier, and as advance/delay data over a time period twice longer than a time period longer or shorter in multiples of a predetermined time interval than the by-design single-circuit cycling time; and
    a transfer-unit rotation-time calculating unit configured to calculate an actual single-circuit cycling time that is the time actually required for the image carrier to rotate through one cycle, based on the reference data and the advance/delay data acquired by the time-series data acquiring unit.

2. The image forming apparatus according to claim 1, wherein the transfer-unit rotation-time calculating unit is configured to:
    calculate differences between respective reflectances included in data A and respective reflectances included in data B, the data A and the data B being included in each of the reference data and the advance/delay data, the data A being time-series data obtained in first measurement, the data B being time-series data obtained in second measurement; and
    select the reference data and each of the advance/delay data in which an average value of the calculated differences of the reflectances becomes minimum so as to calculate a half time of a time used for measuring the selected reference data or each of the selected advance/delay data as the one-cycle-time calculation value.

3. An image forming method performed by an image forming apparatus with a transfer unit including a rotating image carrier onto which a toner image formed by developing an exposure-formed electrostatic latent image is transferred, the rotating image carrier by design having a single-circuit cycling time, the image forming method comprising:
    acquiring, at predetermined time intervals, and independent of rotational position of the image carrier, time-series data with respect to reflectance of a background portion of the image carrier, as reference data over a time period twice longer than the by design single-circuit cycling time of the image carrier, and as advance/delay data over a time period twice longer than a time period longer or shorter in multiples of a predetermined time interval than the by-design single-circuit cycling time; and
    calculating an actual single-circuit cycling time that is the time actually required for the image carrier to rotate through one cycle, based on the acquired reference data and the acquired advance/delay data.

4. A non-transitory computer-readable recording medium storing an image forming program executed by an image forming apparatus with a transfer unit including a rotating image carrier onto which a toner image formed by developing an exposure-formed electrostatic latent images is transferred, the rotating image carrier by design having a single-circuit cycling time, the image forming program causing the image forming apparatus to function as:
    a time-series data acquiring unit configured to acquire, at predetermined time intervals, and independent of rotational position of the image carrier, time-series data with respect to reflectance of a background portion of the image carrier, as reference data over a time period twice longer than the by-design single-circuit cycling time of the image carrier, and as advance/delay data over a time period twice longer than a time period longer or shorter in multiples of a predetermined time interval than the by-design single-circuit cycling time; and
    a transfer-unit rotation-time calculating unit configured to calculate an actual single-circuit cycling time that is the time actually required for the image carrier to rotate through one cycle, based on the acquired reference data and the acquired advance/delay data.

* * * * *